A. EHRHART.
GREASE CUP.
APPLICATION FILED SEPT. 22, 1920.
1,399,944.
Patented Dec. 13, 1921.
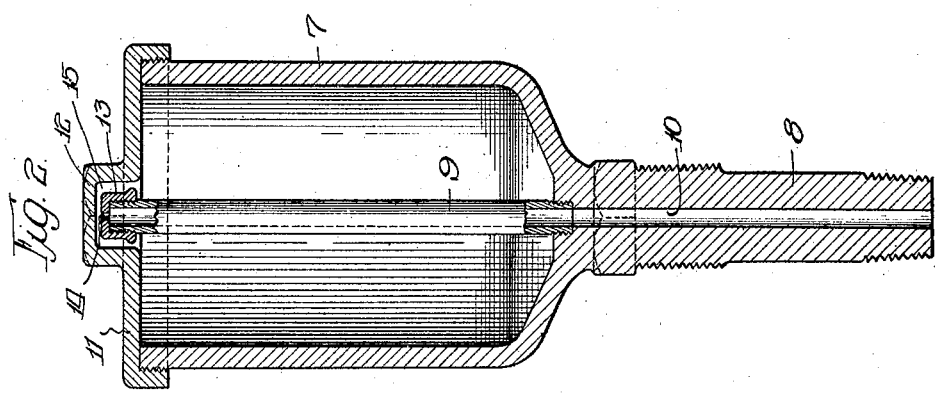
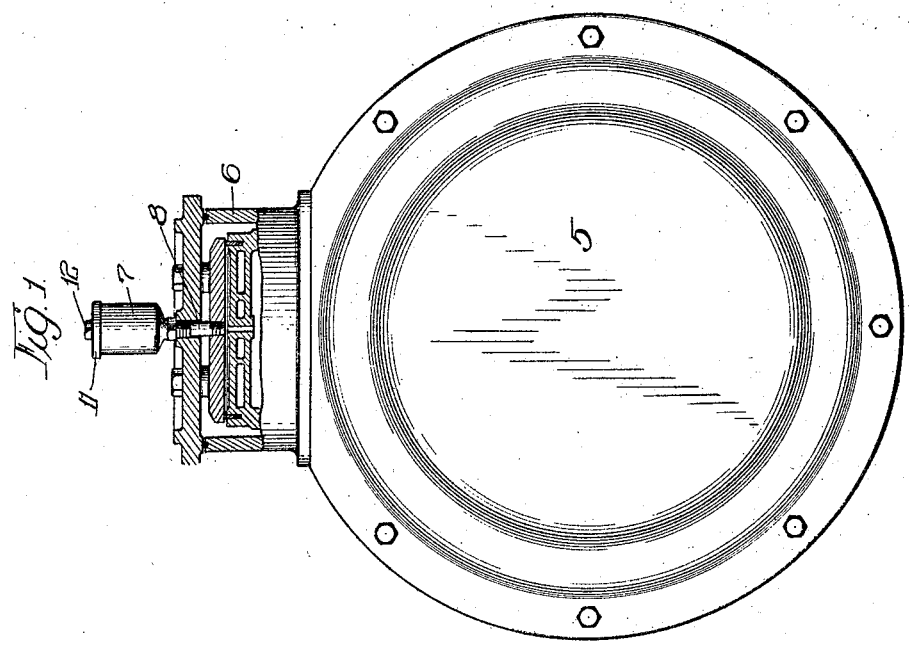
Witness:
R. Burkhardt
Inventor:
Anthony Ehrhart,
By Wilkinson, Huxley, Byron & Knight
Attys.

UNITED STATES PATENT OFFICE.

ANTHONY EHRHART, OF BLUE ISLAND, ILLINOIS.

GREASE-CUP.

1,399,944. Specification of Letters Patent. Patented Dec. 13, 1921.

Application filed September 22, 1920. Serial No. 411,992.

*To all whom it may concern:*

Be it known that I, ANTHONY EHRHART, a citizen of the United States, residing at Blue Island, in the county of Cook and State of Illinois, have invented certain new and useful Improvements in Grease-Cups, of which the following is a specification.

My invention relates to a lubricating and decarbonating device for lubricating and decarbonating steam chests and cylinders of all steam engines, and is applicable to steam chests having slide and piston valves therein.

An object of my invention is to provide a lubricating and decarbonating device for steam cylinders which will be simple in construction, positive in operation and effective and economical for lubrication under all conditions of service.

Another object of my invention is to provide an improved economical lubricator for steam cylinders for successful commercial use.

My invention will be readily understood from an inspection of the drawings, wherein—

Figure 1 shows an end elevation of a cylinder with a steam chest thereon, the latter being in section to show the application of my invention thereto; and Fig. 2 is an enlarged vertical sectional view through a lubricator embodying the preferred form of my invention.

In the drawings, 5 is an engine cylinder having a steam chest 6. A lubricating and decarbonating device comprising a grease cup 7 is connected by means of a stem 8 with the steam chest so as to deliver lubricant to the friction surfaces of the valve and cylinder. The stem of my valve is provided with the usual central opening 10 therethough. A pipe 9 in communication at its lower end with the central opening 10 in the stem 8 is secured in position within the grease cup 7 by threaded engagement therewith. The cup has a top or cover 11 in screw-threaded engagement with the upper end of the same. A central portion of the cover 11 is offset outwardly to form a boss 12, as shown in the drawings. The upper end of the pipe 9 extends into the space within the boss and terminates short of the inner surface thereof. A cap 13 having a centrally disposed opening 14 is removably secured to the upper end of the pipe, the parts being arranged so that a space 15 is provided between the inner surface of the boss 12 and the outer surface of the cap 13.

In carrying out my invention, the cup is packed to the top with hard grease, such as is usually employed for lubricating journal bearings. Steam from the steam chest passes upwardly through the opening 10 in the stem of the valve, through the pipe and into the interior of the grease cup through the opening 14 in the cap of the pipe. Thereupon the upper portion of the packed grease is liquefied to such a state that it readily is carried in suspension by the steam. Further admission of steam tends to drive the steam and its suspended grease somewhere, and as there is only one opening communicating with the interior of the grease cup, the steam and its suspended grease must necessarily be driven through this opening, which is the opening 14 in the pipe cap. This steam and its suspended grease then are carried downwardly to the parts to be lubricated and decarbonated.

As long as steam is admitted to the interior of the gease cup, the grease will be melted and carried in suspension to the lubricating zone, thus lubricating and removing carbon from the valve rings and piston rings.

I have found that a lubricator and decarbonizer constructed in accordance with my invention lubricates and decarbonates steam chests and cylinders efficiently and economically, and that it is possible to utilize hard grease as a lubricant and decarbonizer. It is to be observed that the steam acts directly on the grease and on the upper portion thereof, so that only that part of the hard grease that is to be used for lubricating purposes is subjected to the action of the steam.

While I have described more or less precisely the details of my invention, I do not wish to be understood as limiting myself thereto, as I contemplate changes in form and proportion of parts and the substitution of equivalents as circumstances may suggest or render expedient, without departing from the spirit of my invention.

I claim:

1. A lubricating and decarbonating arrangement for steam chambers, including a grease cup, a cover for said cup having a centrally disposed outwardly projecting boss formed therein, and a pipe in the cup terminating just short of the inner face of the boss and having an opening therein whereby steam may pass through said pipe into the cup and back into the chambers.

2. An improvement in the art of lubricating and decarbonating steam chambers, consisting in delivering steam into a chamber containing a supply of hard grease, melting the grease, and redelivering the steam with the entrapped grease to the chambers, the steam in its passage in both directions passing through a single conduit, said conduit extending through the body of hard grease.

3. A lubricating and decarbonating device including a container for a supply of grease, and means for melting and withdrawing said grease from said container, said means including a single steam pipe entering said container through which steam may pass and leave said container, said steam pipe extending through the interior of said container to a point adjacent the far wall thereof.

4. In combination with a steam-containing chamber, a closed grease cup, a lubricant discharge pipe in said cup extending into the upper portion of the cup, and a passage connecting the lower end of the pipe to the steam chamber.

5. In combination with a steam-containing chamber, a grease cup, a cap for said cup, said cap having an inwardly opening cavity formed therein, a pipe in said cap the upper end of which extends into said cavity, and a passage connecting the lower end of the pipe to the steam chamber whereby steam may enter and leave said cup.

6. The method of lubricating and decarbonating steam-containing chambers, consisting in passing steam through a body of hard grease and into contact with the surface of said hard grease, liquefying and carrying an amount of said grease in suspension in the steam and passing the steam containing said grease into the chambers to be lubricated and decarbonated.

Signed at Chicago, Illinois, this 17th day of September, 1920.

ANTHONY EHRHART.